United States Patent Office 3,575,922
Patented Apr. 20, 1971

3,575,922
SILICON-, NITROGEN- AND OXYGEN-CONTAINING HIGH TEMPERATURE RESISTANT POLYMERS AND PROCESS
Walter Fink, Zurich, Switzerland, assignor to Monsanto Company, St. Louis, Mo.
No Drawing. Continuation-in-part of abandoned application Ser. No. 680,981, Nov. 6, 1967, which is a continuation-in-part of abandoned application Ser. No. 595,033, Nov. 17, 1966. This application June 27, 1969, Ser. No. 837,339
Int. Cl. C08f 11/04
U.S. Cl. 260—46.5
22 Claims

ABSTRACT OF THE DISCLOSURE

Compounds of the formula

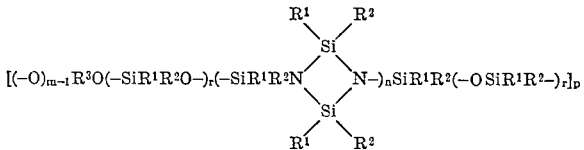

made by reacting a compound $R^3(OH)_m$ with a compound

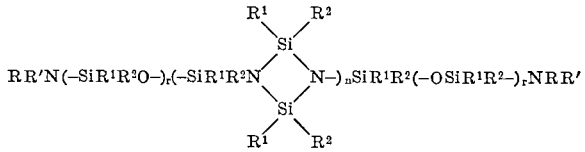

---

This application is a continuation-in-part of copending application Ser. No. 680,981, filed Nov. 6, 1967, now abandoned which is a continuation-in-part of application Ser. No. 595,033, filed Nov. 17, 1966 now abandoned.

The present invention relates to silicon-, nitrogen- and oxygen-containing high temperature resistant polymers and to a process for preparing the polymers. These polymers have the general formula (A)

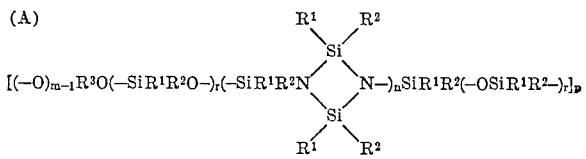

in which $R^1$ and $R^2$ are identical or different and signify fluorine atoms, possibly substituted and/or ethylenically or acetylenically unsaturated hydrocarbyl groups, heterocyclic groups, members of a heterocyclic group or silyl groups, which organic groups and silyl groups each can be linked through an oxygen atom to the silicon atom, $R^3$ signifies a silyl group, a hydrocarbyl group, heterocyclic group, ether group, or a group corresponding to an ether group showing S, S$_2$, SO, SO$_2$, NH, NR″, NSiR*$_3$, SiR*$_2$, P(O)R″, —SiR*$_2$SiR*$_2$—, P(S)R″ or BR″ (R″=organic group as defined for $R^1$ and $R^2$, which can be linked through an oxygen atom; R*=R″ or a fluorine atom) in the place of an ether oxygen atom, or a group —SiR*$_2$—R‴ —SiR*$_2$— (R‴=a divalent organic group), which is at least divalent can be linked via a SiR*$_2$, P(O)R″, P(S)R″ or BR″ group to the oxygen atoms shown in the Formula A, or a divalent silyl group, $n$ represents an integer of 1 to 10, but is preferably 1, $r$ is zero or an integer of 1 to 4, $m$ is an integer of at least 2 and $p$ represents the degree of polymerization.

Under the term "silyl group" is understood herein any silicon containing group being attached through its silicon atom. Under the term "ether group" is understood herein optional group derived from a dialkyl ether, poly(alkyl ether), dicycloalkyl ether, poly(cycloalkyl ether), diaryl ether, poly(aryl ether), diheterocycloalkyl ether, poly (heterocycloalkyl ether), as well as from a cyclic ether.

No polymers consisting of N,N′-disilylated cyclodisilazane units linked by the terminal silyl groups via the oxygen atoms of groups derived from hydroxy compounds, such as alcohols, phenols and silanols, have been known hitherto. The polymers of the invention display unusual temperature resistance. They can be used instead of many hitherto known polymers and they bring essential advantages.

It has been found that the polymers (A) formulated at the beginning are obtained if a bis-(aminosilyl)-cyclodisilazane of the general formula (B)

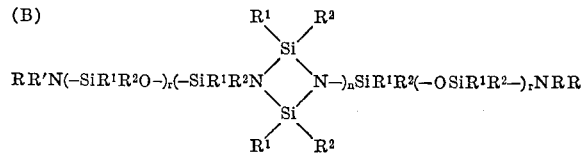

in which $R^1$, $R^2$, $n$ and $r$ are defined as above and RR′N is the $NH_2$ group or the group of a secondary or tertiary amine which is more volatile than the hydroxyl compound to be reacted, and a hydroxyl compound of the general formula (C) 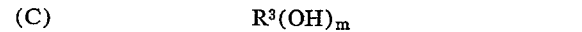

in which $R^3$ is defined as above and $m$ is an integer from 2 to 10, are heated possibly in a solvent until substantially no more ammonia or amine evolves from the reaction mixture.

It has been found that the polymers formulated at the beginning are also obtained if a bis-(halosilyl)-cyclodisilazane of the general formula (D)

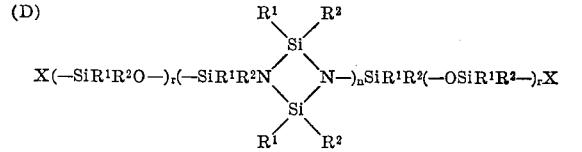

in which $R^1$, $R^2$, $n$ and $r$ are defined as above and X signifies a chlorine atom or bromine atom, is brought to reaction with an alkali salt of a hydroxyl compound (C) in a manner which is known per se.

The bis-(aminosilyl)-cyclodisilazane (B) serving as starting products are available by, for example, the exchange of the halogen atoms for ammonia or amino groups in bis-(chlorosilyl)-cyclodisilazanes. Bis-(dimethyl-chlorosilyl)-tetramethylcyclodisilazane is a known compound. It can be prepared by heating either hexamethylcyclotrisilazane or octamethylcyclotetrasilazane with dimethyldichlorosilane (ratio 1:3 or 1:4 resp.) in the presence of an acid-binding agent (triethylamine), or by heating 1,3-dichloro-tetramethyldisilazane in the presence of an acid-binding agent. Other compounds of this class can be prepared in similar manner.

The condensed bis-(dimethyl-chlorosilyl)-tetramethyl-cyclodisilazane having up to 10 ring units can be prepared by heating hexamethylcyclotrisilazane or octamethylcyclotetrasilazane with dimethyldichlorosilane (ratio 1:1 to 1:2) at higher temperatures (280° to 350° C.). The individual condensation products can be isolated, e.g. by fractional distillation or can be used as a mixture. Other compounds of this class can be prepared in similar manner.

The halogen-amine exchange leading to the starting products (B) can be realized best by using secondary amines. It is desirable that these amines possess a lower boiling point than the hydroxyl compounds to be reacted. In general, lower dialkylamines are preferably used, since in the preparation of the starting products (B), by using ammonia or primary amines, side reactions can easily occur. For the exchange of less reactive halogen atoms in an aromatic silyl group, e.g. diphenylchlorosilyl, however, lower alkylamines should be used. Instead of the amines, alkali salts thereof can also be used.

Examples of group $R^1$ and $R^2$, as they can occur attached to silicon atoms, are: alkyl, alkenyls and alkynyls such as methyl, ethyl, vinyl, ethynyl, n-propyl, isopropyl, allyl, propenyl, propargyl, propynyl, n-butyl, isobutyl, sec-butyl, tert-butyl, methallyl, 1-butenyl, crotyl, butadienyl, 1-butynyl, 2-butynyl, 1-buten-2-ynyl and higher aliphatic groups having up to 24 carbon atoms such as undecenyl, dodecyl, myristyl, oleyl and tetracosyl; moreover, cycloalkyls, cycloalkenyls and cycloalkynyls such as cyclobutyl, cyclopentyl, cyclopentenyl, cyclopentadienyl, cyclohexyl, cyclohexenyl, cyclohexadienyl, cyclohexynyl and greater alicyclic groups having up to 12 carbon atoms such as cyclooctyl, cyclododecyl, cyclooctatrienyl, cyclododecatrienyl and bicyclohexyl; moreover, aralkyls, aralkenyls and aralkynyls such as benzyl, cuminyl, phenylethyl, styryl, phenylethynyl, phenylpropyl, 3-phenylallyl, 2-phenylallyl, 1-phenylallyl, cinnamyl, 1-phenylpropynyl, 1-phenylpropargyl, diphenylmethyl, triphenylmethyl, α-naphthylmethyl, β-naphthylmethyl, 1-(α-naphthyl)ethyl, 2-(α-naphthyl)ethyl, 1-(β-naphthyl)ethenyl, 2-(β-naphthyl)ethyl, 1-(α-naphthyl)-ethenyl, 2-(α-naphthyl) ethenyl, 1-(β-naphthyl)ethenyl, 2-(β-naphthyl)ethenyl, α-naphthylethynyl and β-naphthylethynyl; moreover, alkaryls, alkenylaryls and alkynylaryls such as tolyl, xylyl, mesityl, duryl, ethylphenyl, cumyl, vinylphenyl, ethynyl-phenyl, propargylphenyl, propynylphenyl, tert-butylphenyl, α-vinylnaphthyl, β-vinylnaphthyl, α-ethynylnaphthyl, and β-ethynylnaphthyl; moreover, aryls such as phenyl, o-biphenylyl, m-biphenylyl, p-biphenylyl, m-terphenylyl, p-terphenylyl, 1-naphthyl, 2-naphthyl, 2-anthryl, 9-anthryl, 1-phenanthryl, 2-phenanthryl, 3-phenanthryl, 4-phenanthryl, 9-phenanthryl, indanyl and indenyl; moreover, heterocyclic groups such as pyrryl, furyl, tetrahydrofury, benzofuryl, thienyl, pyrrolinyl, pyrrolidyl, pyrazolyl, pyrazolinyl, pyrazolidyl, imidazolyl, imidazolidyl, benzimidazolyl, thiazolyl, oxazolyl, iso-oxazolyl, triazolyl, pyrazinyl, pyrimidyl, pyridazinyl, pyridyl, pyranyl, thiopyranyl, piperidyl, morpholinyl, thiazinyl, trizinyl, quinolyl, quinazolyl, indolyl, phenazinyl, carbazolyl, etc.

As has been said at the beginning, these organic groups each can be linked to the silicon atoms also through an oxygen atom.

The simplest representatives of starting compounds are 1,3-bis-(diethylamino-dimethylsilyl)-2,2,4,4-tetramethyl-1,3,2,4-diazadisiletidine, 1,3-bis-(diethylamino-diphenylsilyl)-2,2,4,4-tetraphenyl-1,3,2,4-diazadisiletidine and 1,3-bis-[1-diethylamino-silacyclopentyl-(1)-2,4-bis-[silacyclopentyl(1)]-1,3,2,4-diazadisiletidine. In the last mentioned compound, $R^1$ and $R^2$ are members of a heterocycle, i.e. they form together with their silicon atom a silacycloalkyl group. Further examples of such groups are silacyclobutyl, silacyclopentenyl, silacyclohexyl, silacyclohexenyl, silacyclohexadienyl, silacycloheptyl, silacycloheptenyl, silacycloheptadienyl and silacycloheptatrienyl.

Analogous compounds may show other organic groups or a combination of organic groups such as enumerated above in the place of, e.g. methyl. Moreover, the compounds may show a combination of organic groups and fluorine atoms, as, e.g. in the compound 1,3-bis-(diethylamino-fluoro-phenyl-silyl)-2,2,4,4-tetramethyl-1,3,2,4-diazadisiletidine.

It has been found that the enumerated hydrocarbyl groups and heterocyclic groups can have substituents which do not hinder the reaction of invention, i.e., the exchange of the amino group or halogen atom for the constituent derived from a dihydric or polyhydric alcohol, phenol or silanol.

Examples of such substituents are: Cl, Br, I, F, —OR″, —SR″, —SiR*₃, —SiR*₂SiR*₃, —SiR*₂OSiR*₃, —BR*₂, —P(O)R*₂, —P(S)R*₂, —CN and —NO₂ (R″ and R* are defined as before).

Examples of some halogenated hydrocarbon groups are: chloromethyl, dichloromethyl, trichloromethyl, bromomethyl, dibromomethyl, tribromomethyl, fluoromethyl, difluoromethyl, trifluoromethyl, 1-chloroethyl, 2-chloroethyl, 1-bromoethyl, 2-bromoethyl, 1-fluoroethyl, 2-fluoroethyl, 1,2-dichloroethyl, 1,2-difluoroethyl, 2-trichloroethyl, 2-trifluoroethyl, pentafluoroethyl, 2-chlorovinyl, 1-chlorovinyl, 1,2-dichlorovinyl, trichlorovinyl, trifluorovinyl, bromophenyl, fluorophenyl, difluorophenyl, trifluorophenyl, pentafluorophenyl, trichloromethylphenyl and bis(trifluoromethyl)phenyl. Other hydrocarbyl groups and also heterocyclic groups of the enumerated ones, similarly can bear halogen atoms.

Examples of R″O substituents are: methoxy, ethoxy, vinyloxy, n-propoxy, iso-propoxy, 1-propenoxy, 2-propenoxy, iso-propenoxy, n-butoxy, iso-butoxy, sec-butoxy, tert-butoxy, crotoxy, n-amoxy, iso-amoxy, n-octoxy, 10-undecylenoxy, lauroxy, stearoxy, phenylmethoxy, styryloxy, phenylethynyloxy, o-, p- and m-allylphenoxy, phenoxy, toloxy, xyloxy, 3-bi-phenylyloxy, 2-biphenylyloxy, 4-biphenylyloxy, 1-naphthoxy, 2-naphthoxy and asaroxy. The corresponding thio analogues contain sulfur instead of oxygen. Moreover, substituents arising from the polymerization of formaldehyde and obeying to the formula R″OCH₂(OCH₂)ₐO—. Other substituents show the formulae R″OCH₂CH₂(OCH₂CH₂)ₐO and $$R''OCH_2CH_2CH_2(OCH_2CH_2CH_2)_aO-$$

(R″ is defined as before; $a=1–10$) and are originating from the addition of ethylene oxide, or propylene oxide, respectively, and subsequent etherification of the terminal OH group. Further substituents contain some branched ether groupings like veratroxy, anisoxy, phenetoxy, 3,4-dimethoxy-phenoxy, 3-phenoxy-4-methoxyphenyloxy and wholly aromatic analogues as will be enumerated later for the group $R^3$. According to the definition of $R^1$ and $R^2$, these groups can be attached also directly to the silicon atoms.

Examples of some simple representatives of the great class of cyanated and nitrated hydrocarbyl groups are: 2-cyanoethyl, 2-nitroethyl, 2-cyano-n-propyl, 3-cyano-n-propyl, 2,4-dicyano-n-butyl. Other hydrocarbon groups such as enumerated before for $R^1$ and $R^2$ can be found instead of ethyl, n-propyl and n-butyl.

Examples of some silyl substituents of the general formula —SiR*₃, which may be more closely defined by the general formula —SiR″₃, are: trimethylsilyl, tris-(trifluoromethyl)-silyl and other possibly substituted trihydrocarbylsilyls containing alike or different saturated or unsaturated alkyls, cycloalkyls, aralkyls or aryls, as they have been cited for $R^1$ and $R^2$ before, including silyl groups in which Si is a constituent of a heterocyclic ring like in the groups silacyclopentyl, silacyclopentenyl, silacyclohexyl, silacyclohexenyl, silacyclohexadienyl, etc., or which may be more closely defined by the general formulae —SiF₃, —SiF₂R″ and —SiFR″₂, are: trifluorosilyl, methyldifluorosilyl, dimethylfluorosilyl, phenyldifluorosilyl, diphenylfluorosilyl, and other hydrocarbyl-difluorosilyl groups or dihydrocarbyl-fluorosilyl groups containing hydrocarbon groups such as have been mentioned above or which may be more closely defined by the general formulae —Si(OR″)₃, —SiF₂OR″ and —SiF(OR″)₂, are: trimethoxysilyl, methoxydifluorosilyl, dimethoxyfluorosilyl, triphenoxysilyl, phenoxydifluorosilyl, diphenoxyfluorosilyl and other trihydrocarbonoxysilyls, dihydrocarbonoxyfluorosilyls and hydrocarbonoxydifluorosilyls containing alike or different, saturated and unsaturated alkoxyls, cycloalkoxyls, aralkoxyls, alkaroxyls and aroxyls, as they have been cited for —OR″; or finally which may be more closely defined by the general formulae —Si(OR″)₂R″ and —SiR″₂OR″, are: methyl-dimethoxysilyl, dimethylmethoxysilyl and analogues possessing a combination of other organic groups such as have been enumerated before.

The silyl groups can be attached through oxygen and consequently correspond to the general formula O—SiR″$_3$. Some simple representatives are: trifluorosiloxy, trimethylsiloxy, trimethoxysiloxy, triphenylsiloxy, triphenoxysiloxy, dimethyl-methoxysiloxy, methyl-dimethoxysiloxy, phenyl-diphenoxysiloxy, diphenyl-phenoxysiloxy, dimethyl-phenoxysiloxy, phenyl-dimethoxysiloxy, and analogues possessing a combination of other organic groups such as have been enumerated before.

The simplest representative showing Si—Si or Si—O—Si bonds are pentamethyldisilyl, 1-trimethylsilyl-tetramethyldisilanyl, 1,1-bis-(trimethylsilyl)-trimethyldisilanyl, pentamethoxydisilanyl, pentamethoxydisiloxanyl, 1-trimethoxysilyl-tetramethoxydisiloxanyl and 1,1-bis-(trimethoxysilyl)-trimethoxydisiloxanyl. Analogous substituents may contain other organic groups such as have been enumerated for R$^1$ and R$^2$, or fluorine atoms, instead of methyl.

According to the definition set forth at the beginning, these silyl groups can be attached also directly to the silicone atoms of the disilylcyclodisilanzanes.

In order to prepare linear or non-cross-linked end products (A), the described bis-(aminosilyl)-cyclotisilazanes (B) can be brought to reaction with optional diol (C). Organic groups should be considered for R$^3$ which are derived from same saturated or unsaturated hydrocarbons such as have been enumerated above as monovalent groups for R$^1$ and R$^2$. In an aliphatic chain, the hydroxyls can be adjacent or more distant from each other like, e.g., in the compounds ethyleneglycol and 1,12-dodecanediol. The hydroxyls can be present also in chain branches, like, e.g., in the compounds 4,4-bis-(hydroxymethyl)-heptane, 5-hydroxy-4-hydroxymethylnonane and 2,4-diphenyl-6,6-bis-(hydroxymethyl)-octane. In cyclic diols, the hydroxyls can be situated in ortho, meta or para position to each other like, e.g., in pyrocatechin, resorcin and hydroquinone.

The compounds containing the hydroxyls in peri-position like, e.g., 1,8-dihydroxynaphthalene, 1,8-dihydroxydecalin, 1,9-dihydroxyanthracene, 4,5-dihydroxyquinoline and 1,9-dihydroxycarbazole are also suitable. Moreover, the hydroxyls can be found simultaneously on a ring and on an aliphatic chain like, e.g., in the compounds ortho, meta and para hydroxybenzylalcohol, ortho, meta and para β-hydroxyethylcyclohexanol and ortho, meta and para γ-hydroxypropylphenol. Examples of silane diols are 1,3-dihydroxy-tetraphenyldisiloxane and 1,3-bis-(dimethyl-hydroxysilyl)-tetramethylcyclodisilazane. In order to prepare cross-linked end-products (A), there can be employed hydroxyl compounds (C) which contain three or more hydroxyl groups. Examples of some simple representatives are: glycerin, 1,1,1-tris-(hydroxymethyl)-ethane, erythrite, tetrahydroxyneopentane, pentaerythrite, sorbite, pyrogallol, hydroxyhydroquinone, phloroglucin, dihydroxybenzylalcohol, 1,2,3-, 1,2,4- and 1,3,5-trihydroxycyclohexane, trihydroxynaphthalenes, tetrahydroxynaphthalenes, trihydroxy-1,3,5-triazine and tetrahydroxyquinoxaline.

By using simultaneously monovalent and multivalent alcohols, phenols, or silanols, there can be obtained polymers being more or less cross-linked.

Whereas, the choice of substituents occurring in the groups R$^1$ and R$^2$ will suffer some limitation due to difficulties in the preparation of the starting compound (B), many more substituents can be introduced with the hydroxyl compounds.

The following substituents should be considered besides those already mentioned for R$^3$: —COR″, —CSR″, —COOR″, —OCOR″, —COSR″, —CSOR″, —CSSR″, —CONR″$_2$, —N(R″)COR″, —N(R″)COOR″,

—N(R″)CONR″$_2$

—NR″$_2$, —N=NR″, =NR″, —N=NCR″$_2$, —SOR″, —SO$_2$R″, —SO$_2$OR″, —SO$_2$NR″$_2$, —N(R″)SO$_2$R″ and —N(R″)SO$_2$OR″ (R″ is defined as before).

Examples of some acyl substituents showing the general formula —COR′ are: acetyl, n-propionyl, iso-propionyl, acrylyl, crotonyl, propiolyl, n-butyryl, iso-butyryl, valeryl, pivalyl, enanthyl, caprylyl, lauroyl, myristolyl, oleoyl, stearoyl, phenylacetyl, diphenylacetyl, cinnamoyl, benzoyl, naphthoyl, cumoyl, 4-biphenylcarbonyl, anisoyl, phenetolyl, veratroyl, 2,3,4-, 1,4,5- and 3,4,5-trimethoxybenzoyl, p-diphenylaminobenzoyl, cyanoacetyl, trimethylsilylanthranoyl, methoxyacetyl, dimethylaminoacetyl, trimethylsilylaminoacetyl, bis(triphenylsilyl)aminoacetyl, trimethylsiloxyacetyl trichloroacetyl trifluoroacetyl, 2-furoyl, 3-furoyl, pyrroyl, including the thio analogues which correspond to the general formula —CSR″.

Examples of sulfinyl and sulfonyl substituents are those groups which contain a —SO— or —SO$_2$— group in the place of the —CO— group shown in the formula above and consequently correspond to the general formulae —SOR″ and —SO$_2$R″. These groups can occur in the hydrocarbyl groups several times, as well as the carbonyl groups.

Examples of some ester substituents showing the general formula —COOR″ are: carbomethoxy, carbethoxy, carbovinyloxy, carbo-n-propoxy, carbo-2-propenoxy, carbo-isopropenoxy, carboctoxy, carbundecylenoxy, carboctadecoxy, carbophenoxy, including the thion analogues which correspond to the general formulae —COSR″, —CSOR″ and —CSSR″.

Examples of parent sulfonic ester substituents are those groups which possess a —SO$_2$— group in the place of the —CO— group shown in the formula above and which therefore correspond to the general formula —SO$_2$OR″.

The enumerated carboxylic ester groups and sulfonic ester groups can be attached also through a nitrogen atom and thus represent in the first case a urethane group corresponding to the general formula —N(R″)COOR″, including the analogous groups of thiourethanes. In the second case they represent a sulfonamide group and therefore can be expressed by the general formula —N(R″)SO$_2$OR″.

Examples of a further class of ester substituents conforming with the general formula —OCOR″ are: acetoxy, acrylyloxy, n-propionyloxy, crotonyloxy, propiolyloxy, tetrolyloxy, n-butyryloxy, valeryloxy, caproyloxy, caprylyloxy, pelargonyloxy, phenylacrylyloxy, benzoxy, caprylyoxy, lauroyloxy, palmitoyloxy, cumoyloxy, phenylacetoxy, including the thio analogues showing the general formulae —SCOR″, —OCSR″ and —SCSR″.

The esters of dicarboxylic acids, e.g., the ethyl ester of oxalic acid, malonic acid, succinic acid, maleic acid, furamic acid, adipic acid, phthalic acid and the like, can also be present as substituents.

Examples of a further class of ester substituents are those group which possess a —SO$_2$— group in the place of the —CO— group shown in the formula above and consequently correspond to the general formula —OSO$_2$R″.

Examples of some carbamyl substituents showing the general formula —CONR″$_2$ are: the unsubstituted carbamyl group and the organically substituted carbamyl groups like methylcarbamyl, ethylcarbamyl, allylcarbamyl, n-propylcarbamyl, iso-propylcarbamyl, iso-propenylcarbamyl, n-butylcarbamyl, sec-butylcarbamyl, 3-n-butenylcarbamyl, myristylcarbamyl, cyclohexylcarbamyl, phenylcarbamyl, trimethylsilylcarbamyl, dimethyl-phenylsilylcarbamyl, triphenylsilylcarbamyl including the disubstituted carbamyl groups.

Examples of some tertiary amino groups are: dimethylamino, diethylamino, di-n-propylamino, di-iso-propylamino, diallylamino, di-n-butylamino, di-iso-butylamino, di-tert-butylamino, di-3-butenylamino, di-2-butenylamino, di-n-amylamino, di-iso-octylamino, didodecylamino, dicyclohexylamino, dicyclohexenylamino, dibenzylamino, diphenylamino, ditolylamino, bis(diphenylyl)amino, bis-(p-methoxyphenyl)amino, bis(m-phenoxyphenyl)amino, bis(m-trifluoromethylphenyl)amino, N,N,N' - triphenylbenzidino, pyrrolino, pyrrolidino, pyrazolino, piperidino, morpholino, thiazino, N-trimethylsilylpiperazino, tetrahydroquinolino, decahydroquinolino.

Examples of some amido substituents showing the general formula —N(R″)COR″ are: acetamido, chloroacetamido, trifluoroacetamido, benzamido, cyanobenzamido, isopropionylamino, n-butyrylamido, valerylamido, palmitolylamido, tetracosanoylamido, naphthoylamido including the parent imido substituens like phthalimido, pyromellitimido, etc.

Examples of sulfonamido substituents are those groups which contain a —SO$_2$— group in the place of the —CO— group shown in the formula above and which therefore correspond to the general formula

—N(R″)SO$_2$R″

Examples of some azo substituents possessing the general formula —N=NR″ are: methylazo, ethylazo, n-butylazo, iso-butylazo, tert-butylazo, phenylazo, N-phenylphenylene-bis-azo.

Examples of some azino substituents possessing the general formula =N—N=CR″R″ are: acetaldehydazino, acetonazino, hexafluoroacetonazino, benzaldhydazino, acetophenonazino, 2,4'-dichloroacetophenonazino, benzophenonazino, 4,4' - bis - (N-trimethylsilyl-methylamino)-benzophenonazino.

Examples of some alkylidenamino substituents possessing the general formula —N=CR″R″ are: methylenamino, ethylidenamino, 2-trifluoroethylidenamino, vinylidenamino, n-propylidenamino, 1-ethylbutylidenamino, 3 - butenylidenamino, benzylidenamino, α-methylbenzylidenamino, α - phenylbenzyladienamino, cinnamylidenamino.

Examples of some imino substituents possessing the general formula =NR″ are: the organically substituted imino groups like methylimino, iso-butylimino, sec-butylimino, allylimino, cycloheptylimino, phenylethylimino, anisylimino, p-dimethylaminophenylenimino, pentafluorophenylimino, and the like.

The silyl groups, disilyl groups and disiloxanyl groups which have been enumerated above can be attached also through a nitrogen atom to the group R$^3$. Some simple representatives are:

trifluorosilylamino,
trifluorosilyl-methylamino,
bis-(trimethylsilyl)-amino,
trimethoxy silylamino,
trimethoxysilyl-methylamino,
bis-(trimethoxy silyl)-amino,
triphenylsilylamino,
methyl-diphenylsilylamino,
bis-(dimethylphenylsilyl)-amino,
pentamethyldisilanylamino,
pentamethyldisilazanylamino,
pentamethyldisiloxanylamino,
pentamethoxydisilanylamino,
pentamethoxydisilazanylamino
and pentamethoxydisiloxanylamino.

In general, all the cited substitutents are attached to lower alkyls, alkenyls or alkynyls having 1 to 5 carbon atoms or to phenyl. However, they can occur also on higher aliphatic groups or on cycloaliphatic, araliphatic or polynuclear aromatic groups. It may be pointed out that the cited substitutents in the alicyclic and aromatic group can be attached with respect to the ring-connecting group, as well as with respect to each other if several substituents are present, in ortho, meta or para position.

Further examples of suitable reactants (C) are: 2,2'-dihydroxydiethylether, 3,3' - dihydroxyperfluorobicyclohexyloxide, 2,2'-dihydroxydiethylsulfide, 2,2'-, 3,3'- and 4,4'-dihydroxydiphenylsulfide, 1,3-dihydroxyacetone, 2, 2'-, 3,3'-, and 4,4'-dihydroxybenzophenone, 3,3'-dihydroxydicyclohexylsulfoxide, 2,2'-, 3,3'-, and 4,4'-dihydroxydiphenylsulfoxide, 2,2'-dihydroxydiethylsulfone, 2, 2'-, 3,3'-, and 4,4'-dihydroxydiphenylsulfone.

Especially valuable products being distinguished by their great thermal and hydrolytic stability and displaying good thermoplasticity are obtained when the silicon atoms linking the cyclodisilazane rings are connected through a diaryl ether grouping ArOAr. Examples are the divalent groups derived from the following compounds:

phenoxybenzene,
toloxybenzene,
2-biphenylylether,
3-biphenylylether,
4-biphenylylether,
2-biphenylyl-4-biphenylylether,
3-biphenyl-4-biphenylylether,
1-(2-biphenylyloxy)-4-phenoxybenzene,
1-(3-biphenylyloxy)-2-phenoxybenzene,
1-(3-biphenylyloxy)-3-phenoxybenzene,
1-(3-biphenylyloxy)-4-phenoxybenzene,
1-(4-biphenylyloxy)-2-phenoxybenzene,
1-(4-biphenylyloxy)-3-phenoxybenzene,
1-(4-biphenylyloxy)-4-phenoxybenzene,
2,2'-diphenoxybiphenyl,
3,3'-diphenoxybiphenyl,
4,4'-diphenoxybiphenyl,
2,3'-diphenoxybiphenyl,
2,4'-diphenoxybiphenyl,
3,4'-diphenoxybiphenyl,
2,4-diphenoxybiphenyl,
2,5-diphenoxybiphenyl,
2,6-diphenoxybiphenyl,
3,4-diphenoxybiphenyl,
3,5-diphenoxybiphenyl,
1,2,3-triphenoxybenzene,
1,2,4-triphenoxybenzene,
1,3,5-triphenoxybenzene,
2-phenoxyphenylether,
3-phenoxyphenylether,
4-phenoxyphenylether,
2-phenoxyphenyl-3-phenoxyphenylether,
2-phenoxy-4'-phenoxyphenylether,
3-phenoxyphenyl-4'-phenoxyphenylether,
1-phenoxynaphthalene,
2-phenoxynaphthalene,
1,1'-dinaphthalenether,
2,2'-dinaphthalenether,
1,2'-dinaphthalenether, etc., moreover longer chain polyaroxyaryls ArO(ArO)$_a$Ar(Ar=possibly low alkyl-substituted phenyl, biphenyl or naphthyl; $a$ is defined as before). The aroxy groups may be in the ortho, para or meta position with respect to the oxygen atoms of the diols. Moreover, in the enumerated aryls one or more hydrogen atoms may have been replaced by fluorine atoms, thereby the thermoplasticity of the end products will be increased. When in the end products ether groupings are present, the stability against oxidation may be increased by addition of a well-known agent acting as a catalase.

In this invention are included also the corresponding thio ether derivatives containing sulfur instead of oxygen.

Further valuable polymers have the recurring units linked by an oxygen atom or a divalent disiloxanyl group of the formula Si(R*$_2$)O(R*$_2$)Si, where R* is defined as before.

On practically carrying out the process of invention, a bis-(aminosilyl)-cyclodisilazane (B) is mixed with a hydroxyl compound (C) using a convenient proportion and heated until no more substantial quantity of ammonia or amine evolves from the reaction mixture. When ammonia or an easily volatile amine, e.g., diethylamine, is split off, the reaction proceeds rather fast at about 50° to 150° C. In order to afford higher polymeric end products, the reaction is generally carried out in an inert solvent. Suitable solvents are, e.g., straight-chain or branched-chain paraffins having about 6 to 12 carbon atoms, such as n-hexane, n-nonane, n-decane, n-undecane and n-dodecane; cycloparaffins such as cyclohexane, methylcyclohexane, cyclohexene, cycloheptane and cyclooctane; aromatic hydrocarbons such as benzene, toluene, xylene, ethylbenzene, mono- and dialkylnaphthalenes, like 1-methylnaphthalene, 1,4-dimethylnaphthalene, 1-ethylnaphthalene, 2-ethylnaphthalene; hydroaromatic hydrocarbons such as tetralin, decalin, etc.; moreover chlorinated and fluorinated derivatives of the hydrocarbons enumerated above; moreover aliphatic ethers such as methyl-ethylether, ethylether, isopropylether, n-propylether, allylether, ethyl-n-butylether, n-butylether, iso-butylether, benzyl-methylether, ethyleneglycoldimethylether, ethyleneglycoldiethylether, diethyleneglycoldimethylether, etc.; aromatic ether like anisole, phenetole, veratrole, phenylether, phenyl-allylether, phenyl-benzylether, etc.; cyclic ether like furan, tetrahydrofuran, tetrahydrofurfuryl-ethylether, dioxane, etc. Moreover, some other qualified solvents are acetonitrile, benzonitrile, acetone, diethylketone, dimethylsulfone, dimethylsulfoxide, tetramethylenesulfoxide, diethylsulfone, dimethylformamide, dimethylacetamide, ethylacetate, N-ethylmorpholine, pyridine, N,N'-dialkylpiperazines and tetramethylurea. The choice of the appropriate solvent is directed by the solubility of the reactants. Moreover, it can be desirable that the formed polymer separates as soon as possible from the solvent, or such a separation may be undesired. The condensation can be finished in the solvent, or be finished only after elimination of the solvent. Moreover, one can work also without a solvent. The molecular weight of the polymers can be affected in usual manner by addition of chain-terminating agents. Monohydric alcohols or phenols are especially suited. A cross-linking is best achieved by three- or multivalent alcohols or phenols.

The polymers are liquid, waxy, glassy, glutinous or rubber-like according to the radical $R^1$, $R^2$ and $R^3$. If they contain carboxylic, sulfo or other sufficiently acid groups they can be soluble in water in the form of their alkali salts and become insoluble on acidifying. They can be more or less cross-linked and insoluble in any usual organic solvent. They are resistant at temperatures up to 450° C. and also may be still useful at temperatures up to even 1000° C. where sometimes they lose only a part of their organic constituents. Many of the polymers can be processed by the usual thermoplastic methods, such as extrusion, injection molding and blown, calendered and extruded films and some other by conventional rubber molding techniques such as compression and transfer mold. The hard types of the polymeric cyclodisilazanes are casting resins which are workable by using cutting machines, or the polymerization is carried out during the fabrication. The foamed polymers can be prepared in known manner by addition of blowing agents like azo-bis-isobutyronitrile, dinitrosohexamethylenetetramine, etc.

A further object of this invention is the use of the polymeric cyclodisilazanes in the preparation of coatings, films, impregnations, etc. For this purpose the mixture of the starting components, i.e., the bis-(aminosilyl)-cyclodisilazane (B) and hydroxyl compound (C) is applied to a substratum and subjected to such temperatures that the formation of higher polymerized, possibly cross-linked synthetic composition coatings is achieved. The readily prepared polymer can also be applied in a solvent such as hexane, benzene, tetrahydrofuran, acetone, ether, methanol, ethanol, ethylacetate, amylacetate, etc. After evaporation of the solvent, the polymer possibly can be baked on its support. The polymers are excellently suited for lacquers and impregnations of substrates such as paper, textiles, leather, plastics, wood, glass, metals, rubber, etc. The polymers can contain as additives other constituents such as powdered wood, asbestos, glass fiber, metal fibers, pigments, etc., whereby their mechanical properties will be modified.

A further application of the novel polymers comprises heating said polymers at a very high temperature, e.g., 300° C. to 600° C., or higher, whereby a pyrrolytic cross-linking to high temperature resistant masses occurs. This cross-linking can be carried out also on a substratum, e.g., glass fibers, metal foils, etc., whereby a good adhesion to the substratum, or cementing of the substrata, respectively, will be achieved.

EXAMPLE 1

To 6.5 g. (16.05 m mole) of N,N'-bis(-diethylamino-dimethylsilyl)-tetramethylcyclodisilazane, (B.P.$_{0.5}$ 127° C.; $n_D^{20}$ 1.4577) dissolved in 20 ml. of dimethyloxyethane, there are added 2.98 g. (16.05 m. mole) of 4,4'-dihydroxybiphenyl. The solution is refluxed for 2 to 2½ hours. The quantity of diethylamine recovered is 96.8% of theory. After the evolution of diethylamine is complete, the solvent is distilled off under reduced pressure at ambient temperature, and the residue is dried at 100° C./0.1 mm. for 5 hours. Yield 6.63 g. (98.9%). The polymerisate is an almost white powder having slight elastomeric properties, liquefaction point about 400° C. The polymerisate remains liquid up to about 480° C. For softening points and thermogravimetric analyses, see tables. It swells considerably in hexane and benzene.

*Analysis.*—$C_{20}H_{32}N_2O_2Si_4$ (444.9). Calc'd (percent): C, 54.00; H, 7.25; N, 6.30; Si, 25.26. Found (percent): C, 52.68; H, 7.23; N, 6.00; Si, 25.58.

According to the procedure described in Example 1, the following polymers are prepared in about 90 to 100% yields.

EXAMPLE 2

From 1,3 - bis-(dimethyl-diethylaminosilyl)-tetramethylcyclodisilazane and hydroquinone. Solvent xylene, reaction time 32 hours; light yellow powder showing some elasticity. The polymer swells considerably in hexane and benzene.

*Analysis.*—$C_{14}H_{28}O_2N_2Si_4$ (368.8). Calc'd (percent): C, 45.60; H, 7.65; N, 7.60. Found (percent): C, 45.62; H, 7.23; N, 7.15.

EXAMPLE 3

From 1,3 - bis-(dimethyl-diethylaminosilyl)-tetramethylcyclodisilazane and 2,2-bis-(4-hydroxyphenyl)-propane. Solvent dimethoxyethane, reaction time 16 hours; pale rubber-like mass.

*Analysis.*—$C_{23}H_{38}O_2N_2Si_4$ (486.9). Calc'd (percent): C, 56.73; H, 7.87; N, 5.75. Found (percent): C, 56.04; H, 7.73; N, 5.81.

EXAMPLE 4

From 1,3-bis-(dimethyl-diethylaminosilyl)tetramethylcyclodisilazane and resorcin. Solvent xylene, reaction time 7 hours; soft, pale rubber-like mass. The polymer swells considerably in hexane and benzene.

*Analysis.*—$C_{14}H_{28}O_2N_2Si_4$ (368.8). Calc'd (percent): C, 45.60; H, 7.65; N, 7.60. Found (percent): C, 45.33; H, 7.41; N, 7.55.

EXAMPLE 5

From 1,3-bis-(dimethyl-diethylaminosilyl)-tetramethylcyclodisilazane and tetrachlorohydroquinone. Solvent xylene, reaction time 16 hours; white powder.

*Analysis.*—$C_{14}H_{24}O_2N_2Cl_4Si_4$ (506.6). Calc'd (percent): C, 33.20; H, 4.78; N, 5.53; Cl, 28.00. Found (percent): C, 32.69; H, 4.99; N, 6.06; Cl, 27.69.

The polymer decomposes relatively slowly in the range of about 350° C. to 480° C. and rapidly between about 480° C. and 540° C. At about 600° C. the residue is 30% and does not lose further weight on heating up to 900° C.

EXAMPLE 6

From 1,3-bis-(dimethyl-diethylaminosilyl)-tetramethyl-cyclodisilazane and bis - (2-hydroxy-3,5,6-trichlorophenyl)-methane. Solvent dimethoxyethane, reaction time 19 hours; white powder.

Analysis.—$C_{21}H_{28}O_2Cl_6N_2Si_4$ (665.6). Calc'd (percent): C, 37.90; H, 4.24; N, 4.21; Cl, 31.96. Found (percent): C, 38.22; H, 4.18; N, 3.94; Cl, 31.20.

The polymer decomposes very relatively slowly in the range of about 100° C. to 250° C.; faster in the range of about 250° C. to 350° C. and rapidly between about 350° C. and 450° C. A stable residue of 10% is formed when the temperature reaches 500° C. It does not lose further weight on heating up to 900° C.

EXAMPLE 7

From 1,3 - bis - (dimethyl-dimethylaminosilyl)-tetramethylcyclodisilazane and pyrogallol. Solvent xylene, reaction time 35 hours; dark, strongly rubber-like mass. The polymer precipitates after 20% of the amine is liberated.

Analysis.—$C_{18}H_{39}O_3N_3SiO_6$ (514.1). Calc'd (percent): C, 42.06; H, 7.65; N, 8.17. Found (percent): C, 44.92; H, 7.50; N, 7.49.

The cross-linked polymer begins very slowly to decompose at about 150° C. The decomposition is faster in the range of about 480° to 520° C. and again less pronounced up to 900° C. where the residue is still 55% of the original weight of the cross-linked polymer.

EXAMPLE 8

From 1,3 - bis - (diphenyl-dimethylaminosilyl)-tetraphenylcyclodisilazane and 4,4' - dihydroxybiphenyl. Solvent xylene, reaction time 50 hours; the crude polymer is extracted for 2 days with hexane and dried at 80° C./0.1 mm.; white powder.

Analysis.—$C_{60}H_{48}O_2N_2Si_4$ (941.4). Calc'd (percent): C, 76.55; H, 5.14; N, 2.98. Found (percent): C, 76.76; H, 5.30; N, 3.16.

When the polymer is heated at 400° C. for 27 hours, it loses 42% of its original weight. At 800° C. the maximum decrease in weight is 45%.

EXAMPLE 9

From 1,3 - bis-(diphenyl-diethylaminosilyl)-tetraphenyl-cyclodisilazane and 1,4 - bis - (diphenyl-hydroxysilyl)-benzol. Solvent xylene, reaction time 53 hours; white powder. The crude polymer was extracted for 2 days with hexane and dried at 90° C./0.1 mm. White brittle mass.

Analysis.—$C_{78}H_{64}O_2N_2Si_6$ (1229.9). Calc'd (percent): C, 76.17; H, 5.25; N, 2.28. Found (percent): C, 76.35; H, 5.70; N, 2.19.

The polymer decomposes rapidly in the range of about 380° to 580° C. and less rapidly in the range of about 580° C. to 720° C. At 720° C. the residue is 47.5% and stable up to 900° C. and more.

EXAMPLE 10

From 1,3 - bis - (dimethyl-diethylaminosilyl)-tetramethylcyclodisilazane and a mixture consisting of hydroquinone and resorcin in a molar ratio of 1:1, solvent xylene. The polymer is a pale rubber-like mass showing greater toughness than the polymer of Example 4.

EXAMPLE 11

From 1,3 - bis - (dimethyl-diethylaminosilyl)-tetramethylcyclodisilazane and a mixture consisting of hydroquinone and resorcin in a molar ratio of 9:1. Solvent is xylene. The polymer is a pale rubber-like mass displaying elastomeric properties.

On comparing Examples 4, 10 and 11 it becomes apparent that the physical properties of the polymers can be greatly affected by the position of the linking oxygen atoms because of the different steric configuration of the homologues.

EXAMPLE 12

From bis - (3 - dimethyl-diethylaminosilyl - 2,2,4,4-tetramethyl - 1,3,2,4 - diazadisiletidino)dimethylsilane (B.P. 152° C./0.01 mm.; M.P. about —2° C.; cf. compound (B), $n=2$) and 4,4' - dihydroxybiphenyl. Solvent xylene, reaction time 3 hours. Yellowish glutinous powder. Somewhat better soluble in benzene than the analogous compound of example.

Analysis.—$C_{26}H_{50}O_2N_4Si_7$ (647.3). Calc'd (percent): C, 48.24; H, 7.79; N, 8.66. Found (percent): C, 48.18; H, 7.85; N, 8.45.

EXAMPLE 13

From 1,3 - bis - 3' - dimethyl-dimethylaminosilyl - 2',2',4',4' - tetramethyl - 1',3',2',4' - diazadisiletidino-dimethylsilyl) - 2,2,4,4 - tetramethyl - 1,3,2,4 - diazadisiletidine (B.P. 224° C./0.01 mm.; M.P. 65° C.; cf. compound (B), $n=3$) and 4,4' - dihydroxybiphenyl. Solvent xylene, reaction time 3 hours. Yellowish powder having slight elastomeric properties. Soluble in benzene.

Analysis.—$C_{32}H_{68}O_2N_6Si_{10}$ (849.8). Calc'd (percent): C, 45.23; H, 8.07; N, 9.89. Found (percent): C, 45.33; H, 8.02; N, 9.98.

EXAMPLE 14

From bis - [ 3 - (3' - dimethyl-dimethylaminosilyl-2',2',4',4' - tetramethyl - 1',3',2',4' - diazadisiletidino-dimethylsilyl) - 2,2,4,4 - tetramethyl - 1,3,2,4 - diazadisiletidino]-dimethylsilane (B.P. 280° C./0.005 mm.; M.P. 91° C.; c.f. compound (B), n=4) and 4,4'-dihydroxybiphenyl. Solvent xylene, reaction time 3 hours.

Yellowish powder having slight elastomeric properties.

Analysis.—$C_{38}H_{86}O_2N_8Si_{13}$ (1052.3). Calc'd (percent): C, 43.37; H, 8.24; N, 10.65. Found (percent): C, 43.52; H, 8.24; N, 10.71.

EXAMPLE 15

From 1,3 - bis - (dimethyl-diethylaminosilyl) - 2,2,4,4-tetramethyl - 1,3,2,4 - diazadisiletidine and 1,3-dihydroxy-tetraphenyldisiloxane. Solvent xylene, reaction time 32 hours. Yellowish glutinous mass.

Analysis.—$C_{32}H_{44}O_3N_2Si_6$ (673.3). Calc'd (percent): C, 57.09; H, 6.59; N, 4.16. Found (percent): C, 56.90; H, 6.40; N, 3.91.

EXAMPLE 16

1,3 - bis - (3 - diethylaminotetramethyldisiloxyanyl)-2,2,4,4 - tetramethyl - 1,3,2,4 - diazadisiletidine is prepared by reacting the corresponding chloro derivative with diethylamine in the usual manner. 5.4 g. (0.010 mole) of the diethylamino derivative and 1.8 g. (0.010 mole) of 4,4' - dihydroxybiphenyl in 25 ml. of xylene are heated until no more substantial quantity of diethylamine is released. The solvent is removed and the polymer is dried at 100° C./1 mm.

Analysis.—$C_{24}H_{44}N_2O_4Si_6$ (593.2). Calc'd (percent): C, 48.60; H, 7.48; N, 4.72. Found (percent): C, 48.49; H, 7.52; N, 4.61.

The polymer consists of recurring units of the formula (E)

(Me=methyl, $r=1$)

EXAMPLE 17

7.0 g. (0.010 mole) of 1,3 - bis-(5-diethylaminohexamethyltrisiloxanyl) - 2,2,4,4 - tetramethyl - 1,3,2,4-diazadisiletidine and 1.8 g. (0.010 mole) of 4,4'-dihydroxybiphenyl in 25 ml. of xylene are heated and worked up as in the example above.

*Analysis.*—$C_{28}H_{56}N_2O_6Si_8$ (741.5). Calc'd (percent): C, 45.36; H, 7.61; N, 3.78. Found (percent): C, 45.01; H, 7.60; N, 3.81.

The polymer consists of recurring units of formula (E) shown in the foregoing example, where $r=2$.

The chloroderivatives employed as starting materials in the above Examples 16 and 17 can be prepared in known manner. The bis - (chlorodisiloxanyl)-cyclodisilazanes, bis-(chlorotetrasiloxanyl)-cyclodisilazanes corresponding to formula (D) wherein $r=1$ to 3 can be obtained by, for example, reacting an alkali metal derivative of a bis-(hydroxysilyl)-cyclodisilazane with excess dichlorosilane, 1,3-dichlorodisiloxane or 1,5 - dichlorotrisiloxane in an inert solvent.

in which $R^1$ and $R^2$, taken singly, are identical or different and signify fluorine atoms, hydrocarbyl groups, or silyl groups of the formulae $SiR^*_3$, $SiR^*_2SiR^*_3$, $SiR^*_2OSiR_3$,

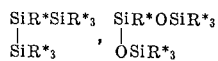

$Si(SiR^*_3)_3$ or $Si(OSiR^*_3)_3$ wherein $R^*$ is a fluorine atom or hydrocarbyl group, which groups can be attached also through an oxygen atom to the silicon atoms of the cyclosilazane group, $R^1$ and $R^2$, taken together, signify with their silicon atom a silacycloalkane group which can contain up to 11 methylene units, $R^3$ signifies a silyl group, a hydorcarblyene group, ether group, or a group corresponding to an ether group in which a divalent radical —S—, —$S_2$—, —SO—, —$SO_2$—, —NH—, —NR''—, —$SiR^*_2SiR^*_2$—, —$NSiR^*_3$—, —$SiR^*_2$—, —P(O)R''—, —P(S(R''— or —BR''— wherein R'' is a hydrocarbyl or hydrocarbyloxy group replaces the —O— of the ether group, or a group —$SiR^*_2$—R'''—$SiR^*_2$— wherein R''' is oxygen, $n$ represents an integer of 1 to 10, $r$ is zero or an integer of

THERMOGRAVIMETRIC ANALYSES
[Weight residue, percent; heating rate: 2.8° C./min.; atmosphere: nitrogen]

| Polymer of Example | Degrees | | | | | | | | | | | |
|---|---|---|---|---|---|---|---|---|---|---|---|---|
| | 300 | 350 | 400 | 450 | 500 | 550 | 600 | 650 | 700 | 750 | 800 | 900 |
| 1 | 100 | 100 | 100 | 99.5 | 94 | 62 | 36.5 | 36 | 36 | 36 | 36 | 36 |
| 2 | 100 | 100 | 100 | 98 | 92.5 | 49 | 44 | 42 | 41 | 40.5 | 40.5 | 43 |
| 3 | 99 | 99 | 98.5 | 97 | 75 | 34 | 25.5 | 30 | 30 | 30 | 30 | 600 |
| 4 | 100 | 99 | 95 | 65 | 49 | 45 | 42.5 | 41 | 40 | 39.5 | 39 | 39 |
| 8 | 100 | 100 | 100 | 100 | 95.5 | 76.5 | 72.5 | 57.5 | 56 | 55.5 | 55.5 | 55.5 |
| 9 | 100 | 100 | 100 | 98.5 | 96.5 | 69.5 | 55.5 | 52 | 50 | 50 | 50 | 50 |
| 12 | 100 | 100 | 100 | 98 | 94 | 72.4 | 44 | 41.5 | 40 | 39.5 | 39.5 | 39.5 |
| 13 | 100 | 100 | 100 | 99.5 | 95 | 84 | 47 | 47 | 33 | 28 | 28 | 27 |
| 14 | 100 | 100 | 100 | 98 | 92 | 78 | 40 | 36.5 | 35 | 35 | 35 | 34.5 |

Softening points

The softening points are defined by the temperature at which a metal rod, exhibiting a pressure of 2.3 kg./cm.$^2$, enters a compact piece of polymer (5 mm. high) ⅗ of its size. A constant heating rate of 20 C. per minute was applied.

| Polymer of example: | Softening point, °C., ±3° |
|---|---|
| 1 | 330 |
| 2 | 90 |
| 3 | 145 |
| 4 | ----- |
| 5 | 238 |
| 6 | ----- |
| 7 | ----- |
| 8 | >324 |
| 9 | 101 |
| 10 | ----- |
| 11 | ----- |
| 12 | 99 |
| 13 | 127 |
| 14 | 119 |
| 15 | ----- |

What is claimed is:

1. A process for preparing silicon-, nitrogen- and oxygen-containing high temperature resistant polymers of the formula

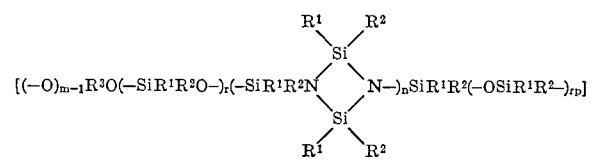

comprising heating at a temperature sufficient to split off ammonia or amine, a bis-(aminosilyl)- cyclodisilazane of the general formula

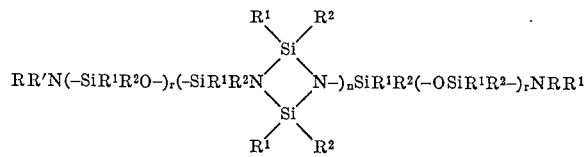

in which $R^1$, $R^2$, $n$ and $r$ are defined as above and R and $R^1$ is H or hydrocarbyl where the NRR' is more volatile than the hydroxyl compound to be reacted and a hydroxyl compound of the general formula

in which $R^3$ and $m$ are defined as above, possibly in a solvent.

2. A process of claim 1 wherein $n$ is 1.

3. A process of claim 1 wherein $R^1$ and $R^2$ are each hydrocarbyl, $R^3$ is hydrocarbylene, $n$ is 1, $m$ is 2, $r$ is zero and R and R' are each hydrocarbyl.

4. A process of claim 1 wherein $R^1$ and $R^2$ are each hydrocarbyl, $R^3$ is halogenated hydrocarbylene, and $n$ is 1, $m$ is 2, $r$ is zero and R and R' are each hydrocarbyl.

5. A process of claim 1 wherein $R^1$ and $R^2$ are each hydrocarbyl, $R^3$ is a 1,4 - bis - (dihydrocarbylsilylene)-phenylene, $n$ is 1, $m$ is 2, $r$ is zero and R and R' are each hydrocarbyl.

6. A process of claim 1 where $R^1$ and $R^2$ are each hydrocarbyl, $R^3$ comprises a mixture of phenylene-1,2 and phenylene-1,4, $n$ is 1, $m$ is 2, $r$ is zero and R and R' are each hydrocarbyl.

7. A process of claim 1 wherein $R^1$ and $R^2$ are each hydrocarbyl, $R^3$ is hydrocarbylene, $n$ is 1, $m$ is 2, $r$ is 1 and R and R' are each hydrocarbyl.

8. A process of claim 1 wherein $R^1$ and $R^2$ are each hydrocarbyl, $R^3$ is hydrocarbylene, $n$ is 1, $m$ is 2, $r$ is 2 and R and R' are each hydrocarbyl.

9. A silicon-, nitrogen- and oxygen-containing high temperature resistant polymer of the formula

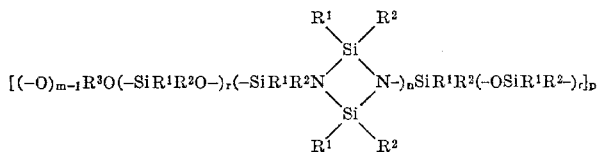

in which $R^1$ and $R^2$, taken singly, are identical or different and signify fluorine atoms, hydrocarbyl groups, or silyl groups of the formulae $SiR^*_3$, $SiR^*_2SiR^*_3$, $SiR^*_2OSiR_3$

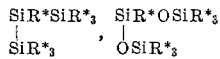

wherein R* is a fluorine atom or hydrocarbyl group, which groups can be attached also through an oxygen atom to the silicon atoms of the cyclosilazane group, $R^1$ and $R^2$, taken together, signify with their silicon atom a silacycloalkane group which can contain up to 11 methylene units, $R^3$ signifies a silyl group, a hydrocarbylene group, ether group, or a group corresponding to an ether group in which a divalent radical —S—, —$S_2$—, —SO—, —$SO_2$—, —NH—, —NR''—, $SiR^*_2SiR^*_2$—, —$NSiR^*_3$—, —$SiR^*_2$—, —P(O)R''—, —P(S)R''— or —BR''— wherein R'' is a hydrocarbyl or hydrocarbyloxy group replaces the —O— of the ether group, or a group —$SiR^*_2$—R'''—$SiR^*_2$— wherein R''' is oxygen, $n$ represents an integer of 1 to 10, $r$ is zero or an integer of 1 to 4, $m$ is 2 and $p$ represents the degree of polymerization.

10. A polymer of claim 9 wherein $n$ is 1.

11. A polymer of claim 9 wherein $R^1$ and $R^2$ are each hydrocarbyl, $R^3$ is hydrocarbylene, $n$ is 1, $m$ is 2 and $r$ is zero.

12. A polymer of claim 9 wherein $R^1$ and $R^2$ are each hydrocarbyl, $R^3$ is halogenated hydrocarbylene, $n$ is 1, $m$ is 2 and $r$ is zero.

13. A polymer of claim 9 wherein $R^1$ and $R^2$ are each hydrocarbyl, $R^3$ is a 1,4 - bis - (dihydrocarbylsilylene)- phenylene, $n$ is 1, $m$ is 2 and $r$ is zero.

14. A polymer of claim 9 wherein $R^1$ and $R^2$ are each hydrocarbyl, $R^3$ comprises a mixture of phenylene-1,2 and phenylene-1,4, $n$ is 1, $m$ is 2 and $r$ is zero.

15. A polymer of claim 9 wherein $R^1$ and $R^2$ are each hydrocarbyl, $R^3$ is hydrocarbylene, $n$ is 2, $m$ is 2 and $r$ is zero.

16. A polymer of claim 9 wherein $R^1$ and $R^2$ are each hydrocarbyl, $R^3$ is hydrocarbylene, $n$ is 3, $m$ is 2 and $r$ is zero.

17. A polymer of claim 9 wherein $R^1$ and $R^2$ are each hydrocarbyl, $R^3$ is hydrocarbylene, $n$ is 4, $m$ is 2 and $r$ is zero.

18. A polymer of claim 9 wherein $R^1$ and $R^2$ are each hydrocarbyl, $R^3$ is tetraphenyldisoloxane-1,3, $n$ is 1, $m$ is 2 and $r$ is zero.

19. A polymer of claim 9 wherein $R^1$ and $R^2$ are each hydrocarbyl, $R^3$ is hydrocarbylene, $n$ is 1, $m$ is 2 and $r$ is 1.

20. A polymer of claim 9 wherein $R^1$ and $R^2$ are each hydrocarbyl, $R^3$ is hydrocarbylene, $n$ is 1, $m$ is 2 and $r$ is 2.

21. A process for preparing pyrolyzed cross-linked silicon-, nitrogen- and oxygen-containing high temperature resistant polymers comprising heating at decomposition temperature a polymer of claim 9.

22. A pyrolyzed polymer made by the process of claim 21.

References Cited

UNITED STATES PATENTS

| | | | |
|---|---|---|---|
| 3,297,592 | 1/1967 | Fink | 260—2 |
| 3,422,060 | 1/1969 | Fink | 260—465 |
| 3,431,222 | 3/1969 | Fink | 260—2 |

DONALD E. CZAJA, Primary Examiner

M. I. MARQUIS, Assistant Examiner

U.S. Cl. X.R.

117—124, 135.1, 138.8, 139, 142, 147, 155; 260—2, 37, 47, 77.5, 79, 79.3